Sept. 14, 1926.  G. H. LANGTON  1,600,185
HAND BRAKE CONSTRUCTION
Filed April 2, 1925    2 Sheets-Sheet 1
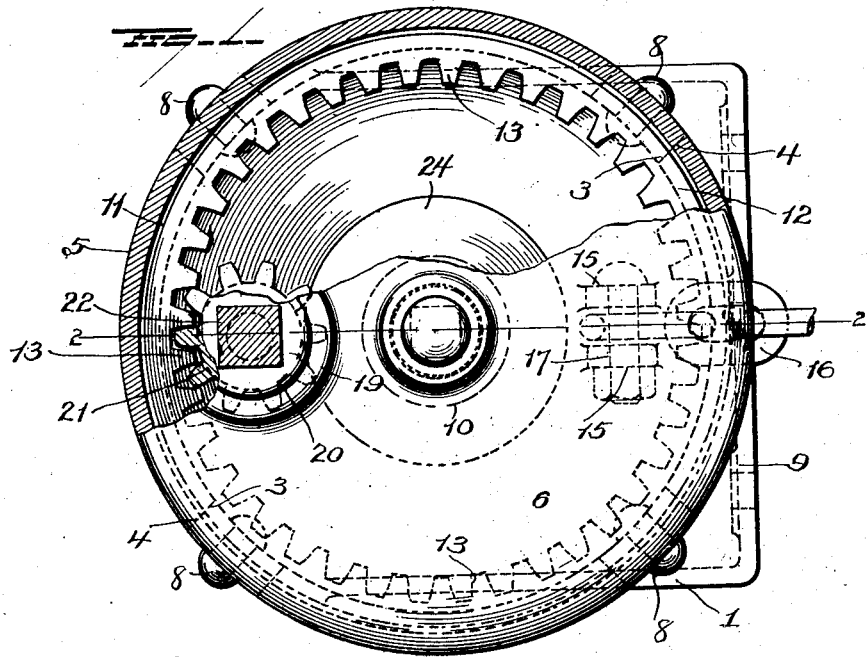
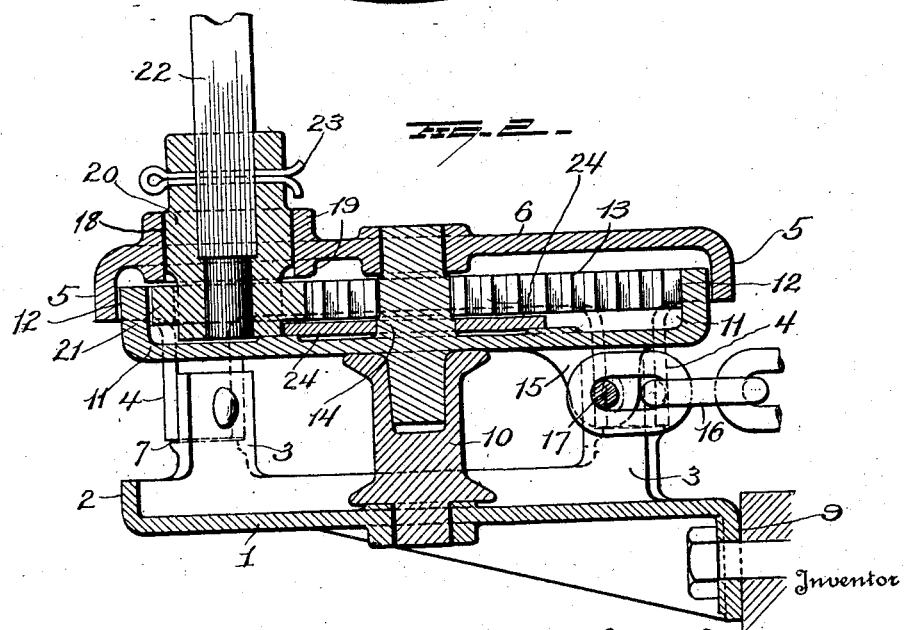
Inventor
G. H. Langton
By Seymour & Bright
Attorney

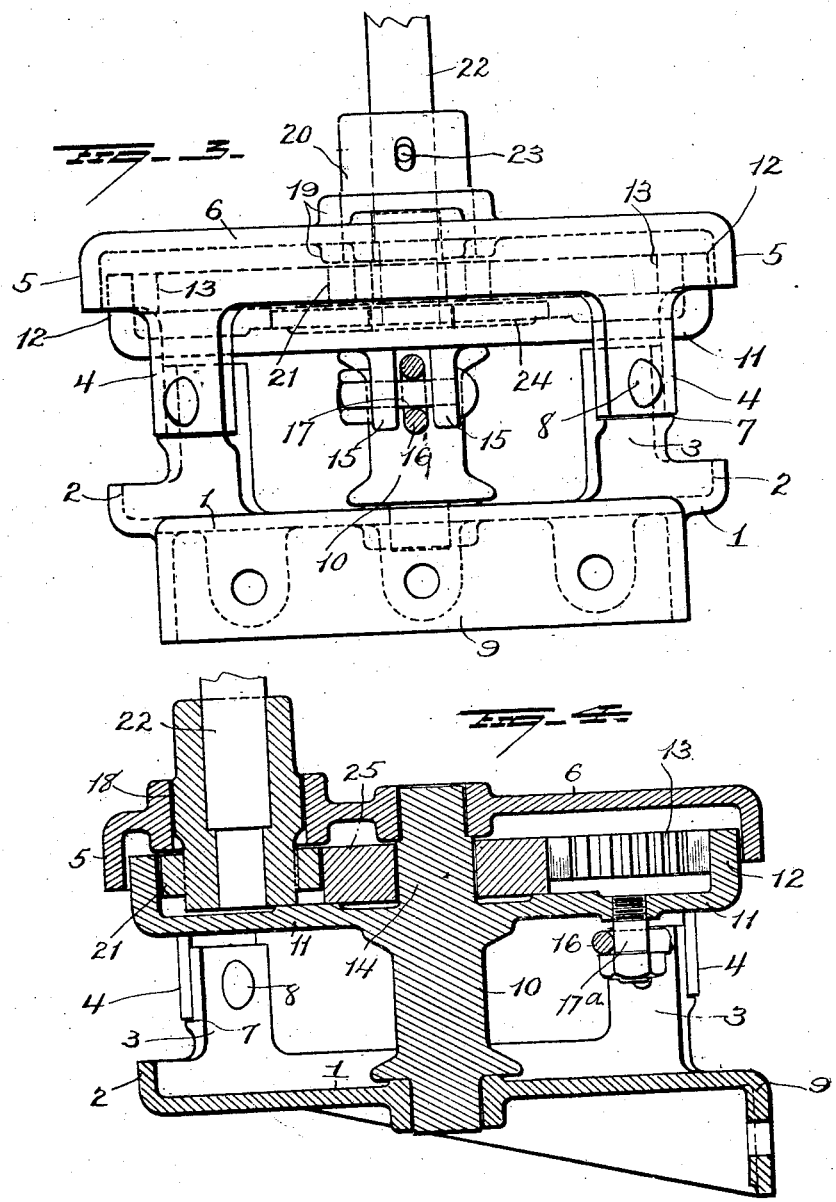

Patented Sept. 14, 1926.

1,600,185

UNITED STATES PATENT OFFICE.

GEORGE H. LANGTON, OF CLIFTON FORGE, VIRGINIA.

HAND-BRAKE CONSTRUCTION.

Application filed April 2, 1925. Serial No. 20,175.

This invention relates to car brakes and has special reference to hand brakes for freight cars, the objects of the invention being to provide a self-contained brake mechanism which is easy to apply to the car, simple to operate, and cheap to manufacture; to provide a geared brake in which all the working parts will be enclosed and protected against ice, snow, coal dust, and damage from falling objects, and to provide a hand brake which will enable the brakeman to exert the same amount of braking force as an air brake without the use of the brake club now generally used in order to increase the power ratio at the wheel. Other objects will appear in the course of the following description, and the invention resides in certain novel features which will be particularly pointed out in the appended claims.

In the accompanying drawings,—

Figure 1 is a plan view partly broken away of my invention.

Figure 2 is a sectional view of the same on the line 2—2 of Figure 1.

Figure 3 is an end elevation, and

Figure 4 is a sectional view of a modification.

The supporting housing comprises a lower member 1 which is essentially a flat circular plate having an upstanding rim 2 from which rise spaced lugs 3, said lugs mating with lugs 4 depending from the downturned rim 5 of the top plate or housing member 6. The lugs 3 are formed with external shoulders 7 upon which the lower ends of the lugs 4 seat and the mating lugs are firmly secured together by bolts or rivets 8. The lower housing member is shown as provided with a flange or bracket 9 on its under side to facilitate the mounting of the device upon the end sill of the car but it is to be understood that the attaching flange or bracket may be formed on the upper housing member, according to the construction of the car upon which the brake mechanism is to be mounted. While in Figure 1 the bracket 9 is located at right angles to a line 2—2 passing through the centers of brake shaft and internal gear said bracket may be placed at any angle with line 2—2 to suit the application. It may also be noted at this point that the device is to be substituted for existing equipment by removing the present step or stirrup and attaching the invention to the lower end of the present brake mast.

The lower housing member 1 is provided with a central opening in which is rotatably fitted the lower end of the winding drum 10, said drum being concentric with the internal gear 11 and receiving motion therefrom. The upper end of the winding drum may be integral with the gear 11 or it may be separate therefrom and formed in its upper end with a flatsided socket receiving a corresponding stem on the under side of the gear. The gear consists of a circular plate having an upstanding marginal rim 12 fitting within the rim 5 of the top housing member 6 and having gear teeth 13 on its inner circumference. The internal gear has a hub 14 which extends up to and is journaled in the top housing member, and on the under side of the gear, adjacent its margin, are a pair of lugs or ears 15 between which one end of the brake chain 16 is secured by a pin 17, in an obvious manner, the chain passing through the open space between successive housing lugs 3, 4. As an alternate construction, the chain may be secured to the underside of the internal gear by means of a vertical stud bolt 17$^a$ (Fig. 4).

Through the top housing member 6 is formed an eccentric opening 18 which is flanged above and below, as indicated at 19, and rotatably receives a sleeve or hub member 20 having a pinion 21 on its lower end which pinion meshes with the teeth 13 of the internal gear 12. The sleeve or hub 20 receives the lower end of the brake mast, indicated at 22, and is secured thereto by any approved means, as a cotter pin 23. The lower side of the pinion 21 is spaced from the upper surface of the internal gear and, to aid in holding the pinion in proper position, a washer 24 is fitted loosely upon the hub 14 and projects under the edge of the pinion and contacts with the hub thereof. While this washer is shown guiding the hub of the pinion at a level below the teeth of the pinion, it may be arranged to guide the pinion at a level above the teeth. If preferred, a pinion 25 may be substituted for the washer, being loosely mounted on the hub 14 and meshing with the pinion 21.

From the foregoing description, taken in connection with the accompanying drawings, it will be seen that I have provided a very compact mechanism in which all the moving parts are enclosed and protected by the housing members, and the construction is simple so that the manufacturing and assembling may be easily and cheaply accomplished. By attaching the chain to the internal gear at a point spaced radially from the drum, the slack in the brake chain will be quickly taken up before the slow wrapping about the winding drum begins and the provision of the internal gear enables the brakeman to obtain a high braking action.

Having fully described my invention what I claim as new and desire to secure by Letters-Patent, is:

1. In a hand brake mechanism, the combination of a housing, an internal gear contained in the housing, a winding drum contained in the housing and connected concentrically with the under side of the gear, a pinion contained in the housing above and meshing with the gear, means for rotating the pinion, the gear having a hub rotatably engaged in the top of the housing, and means on the hub to hold the pinion to the gear.

2. In a hand brake mechanism, the combination of a housing, an internal gear contained in the housing, a winding drum contained in the housing and connected concentrically with the under side of the gear, a pinion contained in the housing above and meshing with the gear, means for rotating the pinion, the gear having a hub extending to and rotatably engaged in the top of the housing, and a washer loosely fitted on said hub and projecting against the hub of the pinion.

3. In a hand brake mechanism, a housing including upper and lower members, marginal spaced lugs rising from the lower member, mating lugs depending from the upper member and seating on and bearing against the sides of the first-mentioned lugs, means securing the lugs together, an internal gear housed in the upper member, a winding drum disposed concentrically between the internal gear and the lower housing member and connected to the gear to rotate therewith, a pinion contained within the upper housing member and meshing with the internal gear, a hub member carrying the pinion and extending through the upper housing member and constructed to be connected with a brake mast, a brake chain, and means for securing an end of the chain to the underside of the gear.

In testimony whereof, I have signed this specification.

GEORGE H. LANGTON.